United States Patent
Tansey et al.

(10) Patent No.: US 6,810,929 B1
(45) Date of Patent: Nov. 2, 2004

(54) TRANSPORTABLE CONTAINER FOR FLUIDIZABLE MATERIAL AND METHOD

(75) Inventors: Richard S. Tansey, Avon Lake, OH (US); Joseph M. Ferencz, Litchfield, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/459,871

(22) Filed: Jun. 12, 2003

(51) Int. Cl.[7] .................................................. B65B 1/04
(52) U.S. Cl. ......................... 141/231; 141/69; 141/70; 222/195
(58) Field of Search ..................... 141/286, 67, 231, 141/11, 12, 69–81; 222/195, 190, 226, 399; 239/319, 325

(56) References Cited

U.S. PATENT DOCUMENTS

| | | | |
|---|---|---|---|
| 1,731,953 A | * 10/1929 | Peter ............................. | 366/5 |
| 1,997,897 A | * 4/1935 | Conley .................. | 239/214.25 |
| 3,656,663 A | 4/1972 | Svensson ..................... | 222/460 |
| 4,172,538 A | 10/1979 | Thelberg ..................... | 222/630 |
| 4,182,386 A | * 1/1980 | Alack ........................... | 141/83 |
| 5,015,126 A | 5/1991 | Kramer ....................... | 406/152 |
| 5,240,185 A | * 8/1993 | Kaiju et al. ................. | 239/690 |
| 5,284,187 A | * 2/1994 | Schmit .......................... | 141/1 |
| 5,427,694 A | 6/1995 | Rugg ......................... | 210/754 |

* cited by examiner

Primary Examiner—Steven O. Douglas
(74) Attorney, Agent, or Firm—Diane R. Meyers

(57) ABSTRACT

A transportable container for fluidizable solids includes a storage container adapted to contain the fluidizable solids is disclosed. The storage container defines an air inlet port for introducing fluidizing air into the storage container and a solids outlet port for discharging the solids from the storage container. A solids outlet conduit may be connected to the solids outlet port for supplying the solids to a downstream process or apparatus. An agitator is provided at the bottom end of the storage container for mixing and maintaining homogeneity of the solids in the fluidizing air. A fluid permeable fluidization membrane is disposed in the storage container below the agitator. The fluidization membrane defines an air chamber below the solids for introducing the fluidizing air into the solids.

21 Claims, 1 Drawing Sheet

TRANSPORTABLE CONTAINER FOR FLUIDIZABLE MATERIAL AND METHOD

FIELD OF THE INVENTION

The present invention relates generally to an apparatus for and a method of supplying fluidizable material from a storage vessel to a downstream process or apparatus. More specifically, the present invention relates to a transportable container for fluidizable solids that may be used to supply a downstream process or apparatus with the solids.

BACKGROUND OF THE INVENTION

It is generally known in the field of solids material handling to provide fluidizable material (i.e., pulverized, powdered, or granulated material) in a carton or container, such as a cardboard carton or container. The contents of this package are then typically transferred to a large supply or distribution hopper. The distribution hopper is used to supply the material to other downstream hoppers, such as gun hoppers, which are generally positioned at the locations where the material is to be used. Thus, there are at least three discreet steps in this prior art process, including providing the package containing the original material, transferring the material to a supply or distribution hopper, and finally supplying one or more end-use hoppers where the material is actually used. The large supply or distribution hoppers used in this process tend to be of large capacity and located a significant distance from the actual end-use locations where the material is to be used. Long-distance transfer systems are, therefore, required to transfer the contents of the supply or distribution hoppers to the individual downstream locations. Such long-distance transfer systems require a substantial capital outlay to install and are expensive to maintain. These systems also typically require capital outlay to install and maintain primary and/or gun hoppers at the point of application.

Transportable containers for fluidizable material that may be provided directly at the site where the material is to be used and that may otherwise obviate the need for large supply or distribution hoppers and distribution systems to transport the material are, therefore, desired.

SUMMARY OF THE INVENTION

The present invention provides for a transportable container and method for supplying fluidizable solids first to a manufacturing facility from a supplier, and then within the facility, such as from an initial point to a downstream process or apparatus without the need to transfer material from one container to another. "Fluidizable solids" and/or "solids" as used herein refer to pulverized, powdered, or granulated material, and include, for example, cement, sand, lime, chalk, flour, sugar, plastic, powder coating, and other similar finely divided material. The transport container of the present invention is generally comprised of a storage container and an agitator, which could be in the form of an agitator blade, angled fluidization plate, or vibration. The storage container includes a top end, a bottom end, and a sidewall extending therebetween for containing the fluidizable solids. The storage container defines an air inlet port for introducing fluidizing air into the storage container and a solids outlet port for discharging the solids from the storage container. The agitator is provided at the bottom end of the storage container for mixing the solids in the fluidizing air, and maintaining homogeneity of solids in the fluidizing air. The bottom end of the storage container may further comprise a transport skid for moving the transportable container.

The air inlet port may be defined in the sidewall of the storage container proximate to the bottom end. A solids outlet conduit may be connected to the solids outlet port for supplying the solids to the downstream process or apparatus. An air vent with a filter may be provided in the top end of the storage container for substantially preventing discharge of the solids to the atmosphere during operation of the agitator (fluidization device). The agitator may be comprised of an impeller, or could be in the form of an agitator blade, angled fluidization plate, or vibration as indicated previously. The impeller is preferably driven by a pneumatic or electric motor.

The transportable container is further comprised of a fluid permeable fluidization membrane disposed in the storage container below the agitator. The fluidization membrane defines a fluidizing air chamber below the solids for introducing the fluidizing air substantially uniformly into the solids received in the storage container. The fluidization membrane is perforated to permit the fluidizing air to pass therethrough and prevent the solids received in the storage container from entering the fluidization air chamber.

The transportable container is used as part of a method of supplying fluidized solids to a downstream process or apparatus in accordance with the present invention. The method includes providing the transportable container comprised of a storage container, which is preferably pre-loaded or filled with the desired fluidizable solids. The storage container is connected either directly or indirectly to the downstream process or apparatus. Fluidizing air is then delivered to the storage container through the air inlet port. The solids are mixed with the fluidizing air using the agitator source or device. The fluidized solids are then distributed to the downstream process or apparatus where the solids are required, for example, by vacuum unloading to the downstream process. The solids are distributed through the solids outlet port in the storage container and may be transported by the solids outlet conduit to the downstream process or apparatus. The method of the present invention may further comprise introducing the fluidizing air substantially uniformly into the solids in the storage container via the air chamber.

The solids may comprise powder coatings. The downstream process or apparatus may be a powder coating device or a paint spray gun. When the solids in the storage container are exhausted, the transportable container may be replaced with a new transportable container filled with a new supply of solids for continued supply of the solids to the downstream process or apparatus.

Further details and advantages of the present invention will become apparent from the following detailed description when read in conjunction with the drawings, wherein like parts are designated with like reference numerals throughout.

DESCRIPTION OF THE PREFERRED EMBODIMENTS

Figure 1:
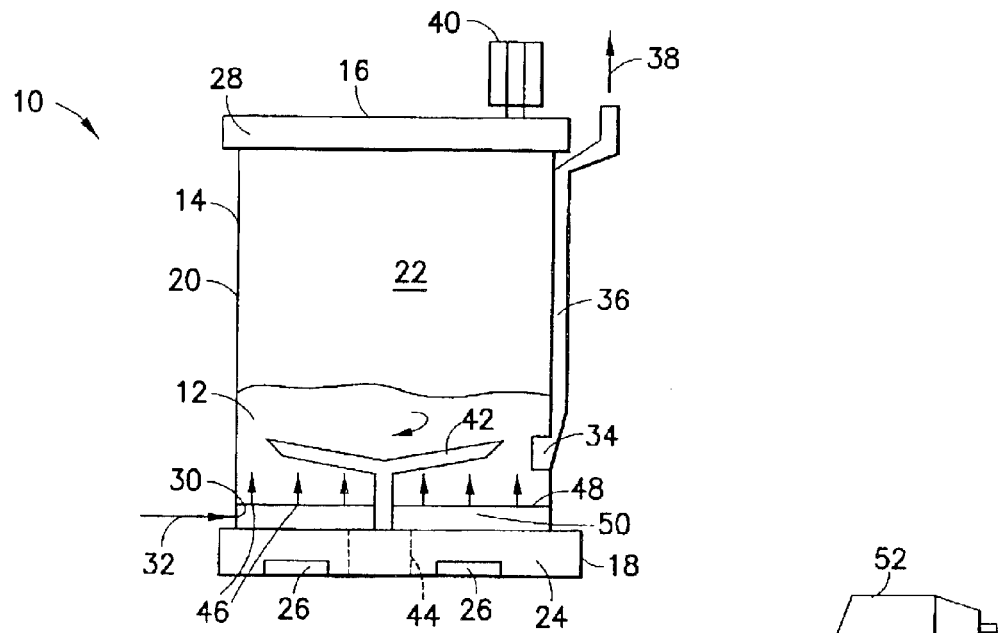
FIG. 1 is a schematic cross sectional view of a transportable container for fluidizable solids in accordance with the present invention.

For purposes of the description hereinafter, the terms "upper", "lower", "right", "left", "vertical", "horizontal", "top", "bottom", and derivatives thereof, when used herein, shall relate to the invention as it is oriented in the drawing figures. However, it is to be understood that the invention may assume alternative variations and step sequences except where expressly specified to the contrary. It is also to be understood that the specific devices and processes illustrated in the attached drawings and described in the following text are simply exemplary embodiments of the invention. Specific dimensions and other physical characteristics related to the embodiments disclosed herein are, therefore, not to be considered limiting.

Figure 2:
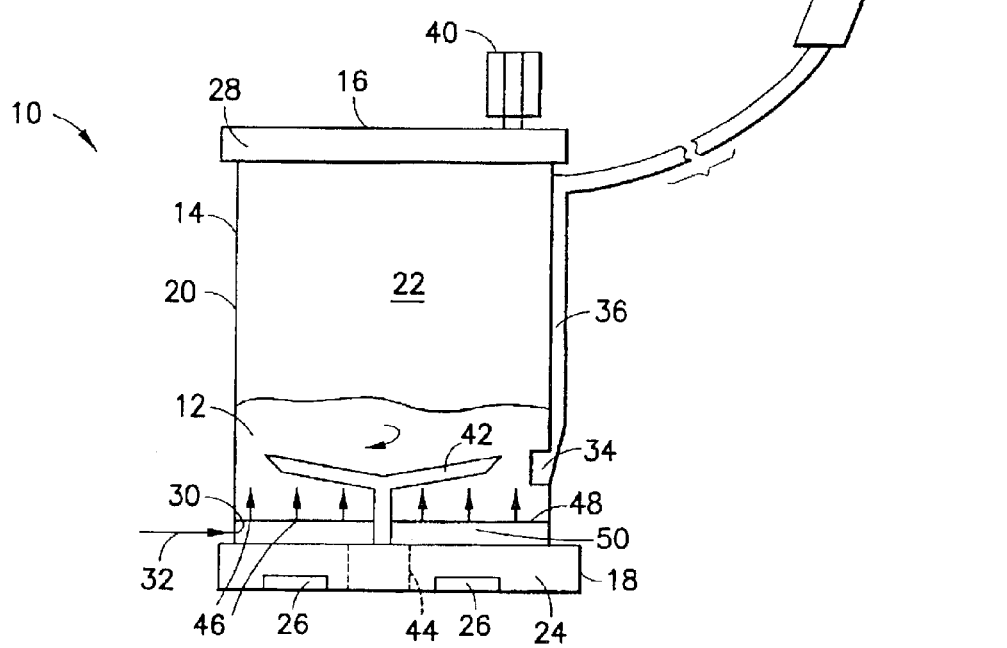
FIG. 2 is a schematic cross sectional view of the transportable container of FIG. 1 showing the transportable container connected to a downstream process or apparatus.

Referring to FIGS. 1 and 2, the present invention is a transportable container 10 for transporting fluidizable solids 12. The transportable container 10 may include any type of particulate or granulated material that may be fluidized with the introduction of a fluidizing medium, such as air. In a specific embodiment, the transportable container 10 is adapted to carry powder coatings and distribute the powder coatings from a distribution location, such as a main hopper, or directly from a shipping container to a downstream painting apparatus (i.e., spray paint gun) used to paint a substrate. Suitable substrates include, for example, any substrates that can be painted with a powder coating, such as a motor vehicle body or frame. The substrates may be made of cold rolled steel, electro, hot dip, and galvaneal zinc coated metals, and various SMC and other plastics.

The transportable container 10 generally includes a storage container 14. The storage container 14 includes a top end 16, a bottom end 18, and one or more sidewalls 20 extending therebetween. The storage container 14 defines an internal space or cavity 22 for containing the solids 12. The storage container 14 may have any suitable shape, such as cylindrical, rectangular, or polygonal, as examples. The present invention will be described in terms of a cylindrical storage container 14 having a single sidewall 20.

The storage container 14 may be made of metal, such as steel, aluminum, or stainless steel, or may be made of plastic, which is light in weight and makes the storage container 14 easily transportable. In one embodiment, the storage container 14 includes a transport skid 24 at the bottom end 18 for ease in moving the transportable container 10 to different locations. For example, the transport skid 24 may define passages 26 for receiving tines of a forklift truck, which may be used to move the transportable container 10. The top end 16 of the storage container 14 may be enclosed by a removable lid 28, which is used to supply the internal cavity 22 with the desired solids 12. The lid 28 is removed to allow access to the transportable container 10 and the solids 12 are deposited therein.

The storage container 14 includes an air inlet port 30, which is preferably defined in the sidewall 20 of the storage container 14 proximate to the bottom end 18. The air inlet port 30 is provided to admit fluidizing medium, such as compressed air, into the internal cavity 22. For example, the air inlet port 30 may be connected to a source of compressed air in a manufacturing facility. Such compressed air sources are readily available in most manufacturing facilities, as will be appreciated by one skilled in the art. The fluidizing (i.e., compressed) air admitted to the storage container 14 is represented schematically by an arrow 32 in FIGS. 1 and 2. The storage container 14 further includes a solids outlet port 34 for discharging the solids 12 from the storage container 14. Preferably, the solids outlet port 34 is connected to a solids outlet conduit 36, which supplies the solids 12 to a downstream process or apparatus, as discussed below. The solids outlet port 34 is also preferably located proximate to the bottom end 18 of the storage container 14. The fluidized solids 12 exiting the storage container 14 are identified schematically by arrow 38 in FIGS. 1 and 2.

The transportable container 10 preferably further includes an air vent and filter assembly 40 provided in the top end 16 of the storage container 14. The air vent and filter assembly 40 provides an exit conduit for the fluidizing air admitted into the internal cavity 22 through the air inlet port 30, particularly when the solids 12 are not being supplied to a downstream process or apparatus through the solids outlet conduit 36. The air vent and filter assembly 40 prevents over-pressurization of the storage container 14 when the solids 12 are not in demand at a downstream process or apparatus. The filter in the air vent and filter assembly 40 substantially prevents discharge of the solids 12 to the atmosphere during operation of the agitating means used to fluidize the solids 12 into the fluidizing air 32, as discussed below.

The transportable container 10 includes an agitator 42 provided at the bottom end 18 of the storage container 14. The agitator 42 is adapted to mix the solids 12 received in the internal cavity 22 of the storage container 14 with the fluidizing air 32 (i.e., compressed air) admitted through the air inlet port 30. The agitator 42 may be, for example, an impeller that is driven by a pneumatic or an electric motor 44, which is illustrated schematically in FIGS. 1 and 2. The agitator 42 assists in maintaining consistent fluidization of the solids 12 in the storage container 14 in a known manner. Arrows 46 in FIGS. 1 and 2 represent the fluidizing air entering the solids 12 during operation of the agitator 42. The pneumatic motor 44 may be driven by the same compressed air source used to supply the storage container 14 with fluidizing air 32. The agitator 42 may also be in the form of an angled fluidization plate or vibration device in addition to the impeller embodiment discussed previously.

The transportable container 10 further includes a fluidization membrane 48 disposed adjacent the bottom end 18 of the storage container 14. The fluidization membrane 48 is located below the agitator 42 and defines an air chamber 50 below the solids 12 received in the storage container 14. The fluidizing air 32 admitted through the air inlet port 30 is received into the air chamber 50 and flows upward through perforations (not shown) in the fluidization membrane 48 to fluidize the solids 12. The air chamber 50 is configured to uniformly distribute the fluidizing air 46 into the solids 12 provided in the storage container 14. The perforations in the fluidization membrane 48 are preferably sized to permit fluidizing air 46 to pass therethrough while preventing the solids 12 from entering the air chamber 50.

As shown in FIG. 2, the transportable container 10 may be used to provide the solids 12 to a downstream process or apparatus 52. For example, the downstream process or apparatus 52 may be a delivery hopper used to distribute the solids 12 to another process or apparatus, or may be the end-use location for the solids 12. In the latter example, the downstream process or apparatus 52 may be a specific piece of machinery, such as a paint spray gun (as illustrated in FIG. 2) for applying paint to an automobile body or frame or other paintable surfaces.

The transportable container 10 of the present invention provides numerous advantages. For example, the present transportable container 10 eliminates the need to transfer the pulverized, powdered, or granulated solids 12 from a shipping carton or container to a large supply or distribution hopper. The transport container 10 of the present invention further eliminates the need to transfer the solids 12 from the large supply or distribution hopper to one or more downstream hoppers, such as hoppers used to feed paint spray guns for applying paint to substrates. In multi-color systems, the transport container 10 of the present invention can be used to significantly reduce the total number of distribution hoppers required.

In some embodiments, these downstream hoppers can be eliminated as well. Thus, significant reductions in capital expenditures can be realized according to the present invention. The transportable container 10 may include storage containers 14 of any size or shape and, once the solids 12 contained in the storage container 14 are exhausted, the entire transportable container 10 may be replaced by another filled transportable container 10. The emptied transportable container 10 may be returned to the manufacturer for refilling and refitting as necessary.

In operation, the transportable container 10 is provided at the desired location for supplying the fluidizable solids 12 to the downstream process or apparatus 52. The transportable container 10 is easily positioned by, for example, a forklift truck using the transport skid 24 provided at the bottom end 18 of the storage container 14. The storage container 14 containing the solids 12 is placed in fluid communication with a source of fluidizing air 32 (i.e., compressed air) or other fluidizing medium. In particular, the storage container 14 is placed in fluid communication with the fluidizing air 32 or other medium source through the air inlet port 30. The solids outlet port 34 is connected to the downstream process or apparatus 52 either directly or indirectly. Once the transportable container 10 is properly positioned and connected, the fluidizing air 32 is delivered to the storage container 14 through the air inlet port 30. The fluidizing air 32 enters the air chamber 50 below the fluidization membrane 48 and flows through the fluidization membrane 48 to enter the solids 12 located in the internal cavity 22 of the storage container 14. The fluidizing air 46 mixes with the solids 12, which fluidizes the solids 12. The agitator 42 assists in mixing the solids 12 into the fluidizing air 46 and maintains homogeneity of the solids 12 in the fluidizing air 46. The solids 12 are then preferably evacuated out of the solids outlet port 34 and transported to the downstream process or apparatus 52 via the solids outlet conduit 36. Once the solids 12 in the storage container 14 are exhausted, a new transportable container 10 may be substituted in place of the first transportable container 10. Thus, the entire transportable container 10 is fluidized when delivering solids 12 to the downstream process. Vacuum unload may be used to assist in the delivery of solids to the downstream process or apparatus 52 via the solids outlet conduit 36.

While the preferred embodiments of the present invention are described above, obvious modifications and alterations of the present invention may be made without departing from the spirit and scope of the present invention. The scope of the present invention is defined in the appended claims and equivalents thereto.

The invention claimed is:

1. A transportable container for fluidizable solids, comprising:
   a storage container comprising a top end, a bottom end, and a sidewall extending therebetween for containing fluidizable solids, the storage container defining an air inlet port for introducing fluidizing air into the storage container and a solids outlet port for discharging the solids from the storage container; and
   an agitator provided at the bottom end of the storage container for fluidizing and rotationally mixing and maintaining homogeneity of the solids in the fluidizing air.

2. The transportable container of claim 1, wherein the bottom end of the storage container comprises a transport skid for moving the transportable container.

3. The transportable container of claim 1, wherein the air inlet port is defined in the sidewall of the storage container proximate to the bottom end.

4. The transportable container of claim 1, further comprising a solids outlet conduit connected to the solids outlet port for supplying the solids to a downstream process or apparatus.

5. The transportable container of claim 1, further comprising an air vent with a filter provided in the top end of the storage container for substantially preventing discharge of the solids to the atmosphere during operation of the agitator.

6. The transportable container of claim 1, wherein the agitator comprises an impeller.

7. The transportable container of claim 6, wherein the impeller is driven by a pneumatic or an electrical motor.

8. The transportable container of claim 1, further comprising a fluid permeable fluidization membrane disposed in the storage container below the agitator, the fluidization membrane defining an air chamber below the solids for introducing the fluidizing air substantially uniformly into the solids received in the storage container.

9. The transportable container of claim 8, wherein the fluidization membrane is perforated to permit the fluidizing air to pass therethrough and prevent the solids received in the storage container from entering the air chamber.

10. A transportable container for fluidizable solids, comprising:
    a storage container comprising a top end, a bottom end, and a sidewall extending therebetween for containing fluidizable solids, the storage container defining an air inlet port for introducing fluidizing air into the storage container and a solids outlet port for discharging the solids from the storage container;
    a solids outlet conduit connected to the solids outlet port for supplying the solids to a downstream process or apparatus;
    an agitator provided at the bottom end of the storage container for fluidizing and rotationally mixing and maintaining homogeneity of the solids in the fluidizing air; and
    a fluid permeable fluidization membrane disposed in the storage container below the agitator, the fluidization membrane defining an air chamber below the solids for introducing the fluidizing air substantially uniformly into the solids received in the storage container.

11. The transportable container of claim 10, wherein the bottom end of the storage container comprises a transport skid for moving the transportable container.

12. The transportable container of claim 10, wherein the air inlet port is defined in the sidewall of the storage container proximate to the bottom end.

13. The transportable container of claim 10, further comprising an air vent with a filter provided in the top end of the storage container for substantially preventing discharge of the solids to the atmosphere during operation of the agitator.

14. The transportable container of claim 10, wherein the agitator comprises an impeller.

15. The transportable container of claim 10, wherein the fluidization membrane is perforated to permit the fluidizing air to pass therethrough and prevent the solids received in the storage container from entering the air chamber.

16. A method of supplying fluidizable solids to a downstream process or apparatus, comprising:
    providing a transportable container comprising a storage container containing fluidizable solids, the storage container defining an air inlet port and a solids outlet port and further comprising an agitator provided at a bottom end of the storage container;

connecting the storage container to a downstream process or apparatus;

delivering fluidizing air into the storage container through the air inlet port;

fluidizing and rotationally mixing the solids in the fluidizing air with the agitator;

distributing the solids to the downstream process or apparatus through the solids outlet port; and replacing the transportable container with a new transportable container when the solids are exhausted.

17. The method of claim 16, wherein the solids comprise powder coating.

18. The method of claim 16, wherein the downstream process or apparatus comprises a powder coating distribution hopper.

19. The method of claim 16, wherein the downstream process or apparatus comprises a paint spray gun.

20. The method of claim 16, wherein the step of distributing the solids to the downstream process or apparatus through the solids outlet port comprises vacuum unloading the solids to the downstream process or apparatus.

21. The transportable container of claim 8, wherein the fluidization plate comprises an angled fluidization plate.

* * * * *